May 5, 1942.    C. S. ASH    2,281,541

DUAL WHEEL ASSEMBLY

Filed Sept. 12, 1940    2 Sheets-Sheet 1

INVENTOR
C. S. Ash
BY Morgan Finnegan & Durham
ATTORNEYS

May 5, 1942.                C. S. ASH                2,281,541
                        DUAL WHEEL ASSEMBLY
                       Filed Sept. 12, 1940          2 Sheets-Sheet 2

INVENTOR
C. S. Ash
BY
Morgan, Finnegan & Durham
ATTORNEYS

Patented May 5, 1942

2,281,541

UNITED STATES PATENT OFFICE 2,281,541

DUAL WHEEL ASSEMBLY

Charles S. Ash, Milford, Mich.

Application September 12, 1940, Serial No. 356,413

8 Claims. (Cl. 180—22)

The present invention relates to new and useful improvements in driven dual wheel assemblies for automotive vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
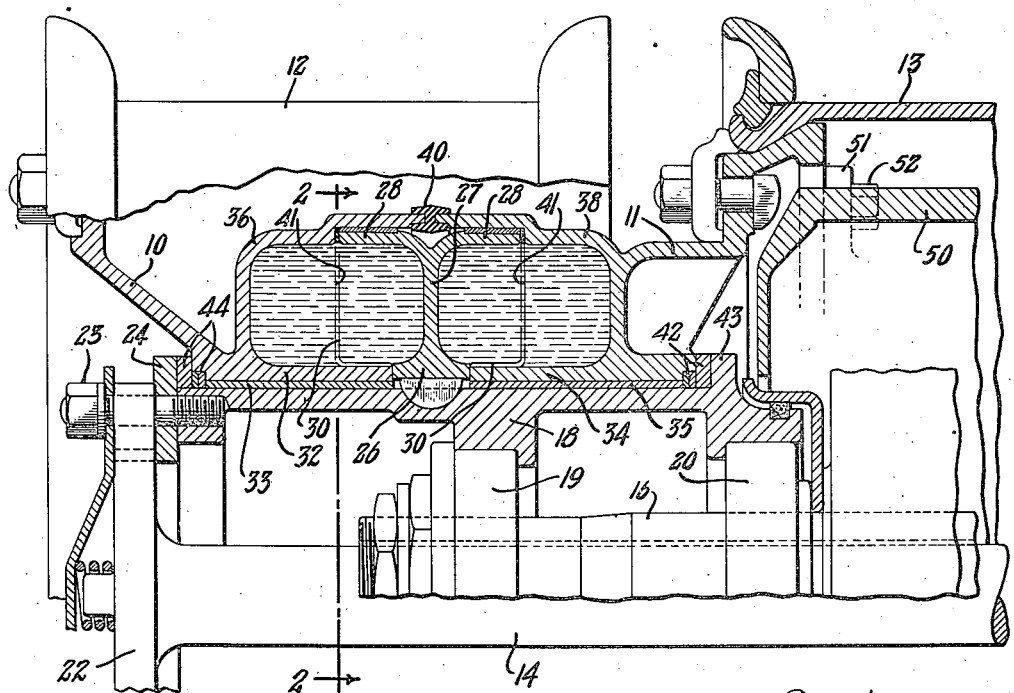
Figure 1 is a fragmentary vertical section of a typical and illustrative embodiment of the present invention.

The present invention has for its object the provision of a novel and improved dual wheel assembly in which independently rotatable wheels are subjected to equal torque or driving force. A further object of the invention is the provision of an independently rotatable dual wheel assembly in which the drive is transmitted to the independently rotatable wheels without the use of differential gears or one way clutches. Still another object of the present invention is the provision of a dual wheel assembly having independently rotatable and separately driven dual wheels which permit the motive power to be transmitted to the wheels at either side of the vehicle without the use of a conventional and almost universally employed central differential. The invention further provides independently driven and independently rotatable dual wheels in which the power is transmitted to the dual wheels by means of a fluid drive forming a part of a dual wheel assembly.

As illustratively shown in the accompanying drawings, the invention is applied to the driving and braking of independently rotatable dual wheels mounted side by side in coaxial relation and particularly adapted for use with automotive road vehicles. The wheels are illustratively shown as non-dirigible wheels on a full floating axle, but the invention is applicable to other types of wheels mounted in another manner.

In accordance with the present invention, the power for driving the dual wheels is transmitted to the wheels from an impeller which is driven from the axle shaft and drives each of two vaned turbine rotors, one of which is connected to each of the dual wheels. Preferably, the impeller is positioned between the two rotors, and the impeller and rotors are contained within a liquid-tight chamber which serves to contain the hydraulic fluid through which the rotors are driven from the impeller. As embodied, each of the wheels is independently journalled for rotation upon a sleeve which is directly driven by the axle shaft, and the impeller is positioned between the two wheels and positively connected to the sleeve, being positioned with one of the rotors on each of its sides, and each side of the impeller and its respective rotor forming a hydraulic coupling or hydraulic torque converter. Means are preferably provided for preventing substantial axial movement of the wheels with respect to each other or with respect to the sleeve on which they are mounted, and the couplings are preferably substantial duplicates of each other so that the torque applied to the two wheels is equalized. Braking means are provided and preferably comprise a positive mechanical brake directly operating on one of the wheels, and transmitting braking force to the other wheel through the hydraulic couplings.

In a modified embodiment of the invention, the hydraulic couplings for the two wheels are separated, coaxial and overlie each other, the impeller being of reduced diameter and fitting within the turbine rotor carried by and fastened to the respective wheel. Conveniently, the turbine rotors may be formed as an integral part of the wheel structure, and to economize on space may be located within the tire rim of the outer wheel which may extend inwardly from the outer wheel.

It will be understood that the foregoing general description and the following detailed description as well, are exemplary and explanatory of the invention but are not restrictive thereof.

Figure 2:
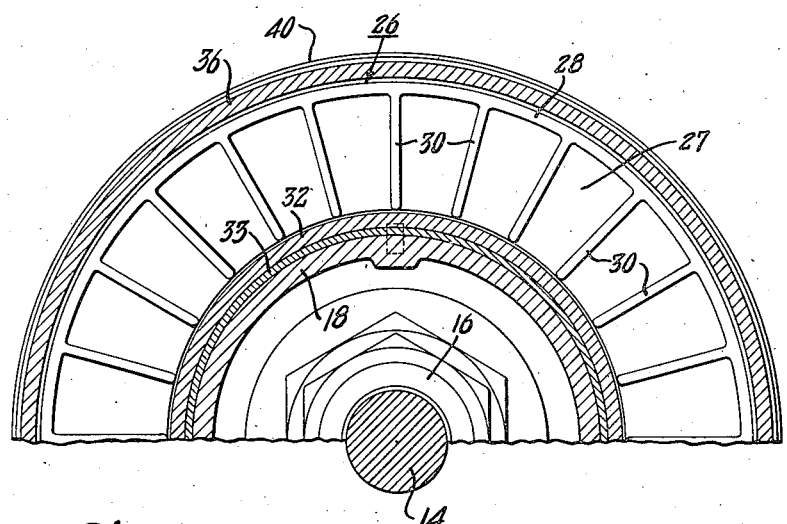
Figure 2 is a fragmentary sectional view taken on the line 2—2 of Figure 1, with certain parts omitted.

Referring now in detail to Figures 1 and 2 of the accompanying drawings, the invention is illustratively shown as applied to the driving of dual wheels 10 and 11 which carry the conventional demountable tire rims 12 and 13, and are to be driven from the axle shaft 14.

Axle shaft 14 is housed within the axle housing 16 and projects beyond the end thereof while the end of the axle housing 16 rotatably carries the cylindrical sleeve member 18 on anti-friction bearings 19 and 20. The end of the shaft 14 is flanged and this flange 22 is bolted to the end of the sleeve 18 by cap screws 23, these bolts also serving to hold a thrust flange 24.

Centrally of the sleeve 18 and keyed thereto is an annular impeller 26 having a radially extending central web 27 with divergent cylindrical rims 28, and this impeller is provided on each of its sides with radially extending vanes 30 which are preferably integral with the web 27 and one of the rims 28, these vanes extending substantially to the edge of rim 28. Wheel 10 is provided with an inwardly-extending cylindrical hub portion 32 which is bored to receive bushing 33 to fit accurately on the surface of cylindrical sleeve 18, and wheel 11 is similarly provided with an outwardly-extending hub portion 34 which is bored to receive the bushing 35 by which it is journalled on the inner portion of the sleeve 18.

The outer wheel is also provided with an integral dished portion 36 which extends outwardly from the hub and thence inwardly of the axle and overlies the impeller rim 28, and the inner wheel is similarly provided with a dished portion 38 which extends outwardly of the hub and thence outwardly of the axle to overlie the other impeller rim 28, and the adjacent edges of the dished portions 36 and 38 are finished to receive a sealing gasket 40 between them substantially in the plane of the impeller web 27. Gasket 40 preferably forms a relatively tight seal between the dished portions 36 and 38, but is not sufficiently tight to prevent relative free independent rotation of the wheels 10 and 11, and forms a closed hydraulic chamber enclosing the impeller 26. Within the dished portions 36 and 38 are formed radial vanes 41 similar in number and shape to the impeller vanes 30, and these vanes extend axially almost into contact with the vanes 30 of the impeller.

For preventing substantial axial movement of the dual wheels with respect to each other and with respect to the sleeve 18, thrust bearings 42 are provided between the shoulder 43 at the inner end of the sleeve 18, and the inner end of the inner hub 34, and similar thrust washers 44 are provided between the outer end of the outer hub 32, and the thrust plate 24.

For braking the dual wheel assembly, a brake drum 50 of conventional cylindrical form is attached to the inner wheel 11 near its periphery by lugs 51 and bolts 52, and cooperates with conventional brake shoes (not shown) so that a positive braking effort may be applied to the inner wheel 11, and this braking effort is transmitted through the impeller 26 to the outer wheel 10, thereby applying a substantial braking effort to the outer wheel.

In the operation of the embodiment of Figures 1 and 2, the shaft 14 is driven from the motor of the automotive vehicle and this driving force is directly applied to the sleeve 18 and the impeller 26. As the impeller 26 is rotated its vanes 30 rotate the oil or other hydraulic fluid within the hydraulic chamber and impart a considerable velocity to it, and this rapidly moving liquid is deflected axially away from the central portion 27 of the impeller into the intervening space between the vanes 41 of the turbine rotors which are thereby impelled to rotate in the same direction as the impeller 26. The hydraulic liquid flows in a clockwise direction within the hydraulic coupling to the right of the impeller 26, and in a counter-clockwise direction within the coupling to the left of impeller 26.

As distinguished from differential gearing transmitting the driving torque from the shaft 14 to the wheels 10 and 11, the hydraulic coupling of the present invention transmits the same torque to each of the wheels and always tends to rotate both wheels in the same direction as the shaft 14, at the same time automatically resisting any tendency of either wheel to travel at a different speed or in a different direction than the shaft. However, due to the slip which is inherent in any hydraulic coupling, particularly when it is operating at relatively low speeds, sufficient free independent rotation is permitted to allow the proper relative rotation of the wheels as the vehicle turns or as may be necessary to compensate for the unequal loading of the tires, or slight inequalities in tire diameters. This relatively small slip is also sufficient to compensate for the necessary difference in rotation of the wheels at the opposite sides of the vehicle, as the vehicle turns corners, and in most cases the use of the hydraulic coupling for transmitting the driving force from the axle shaft to the dual wheels permits the conventional differential gearing at the center of the axle shaft to be eliminated.

Figure 3:
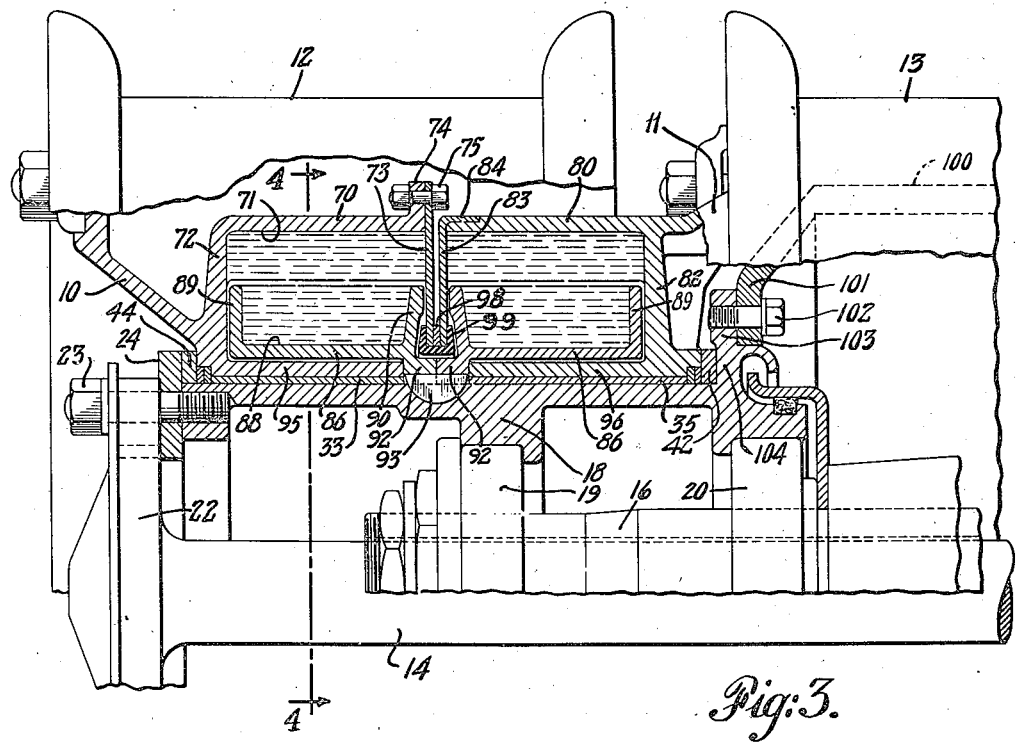
Figure 3 is a fragmentary vertical sectional view of another illustrative embodiment of the present invention.
Figure 4:
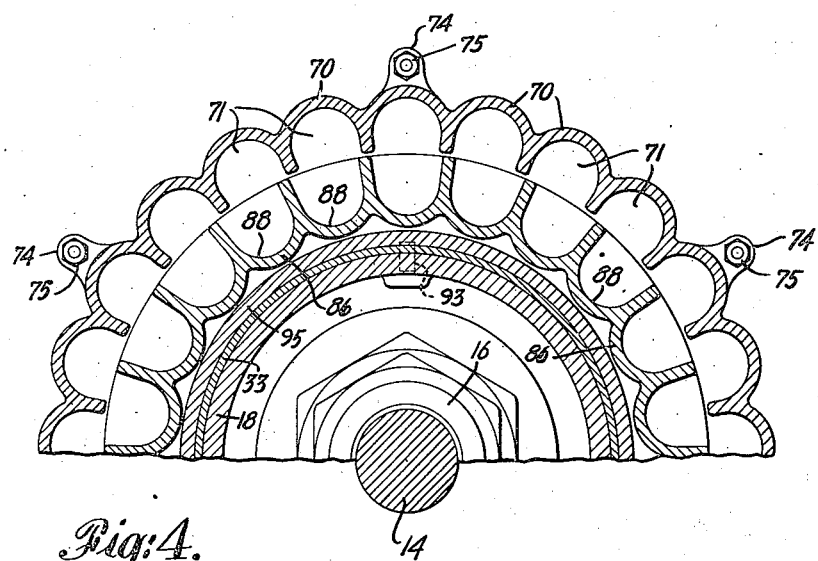
Figure 4 is a sectional view taken on the line 4—4 of Figure 3, certain parts being omitted for the sake of clearness.

Figures 3 and 4 of the drawings illustrate a modified embodiment of the invention in which separate impellers and runners are provided for the two side by side wheels, the impellers being driven in unison from a common source of power. As embodied, the outer wheel 10 is provided with an inwardly extending runner 70 formed with a relatively large number of cylindrical pockets 71, these pockets being closed at one end by means of the radially extending web portion 72 and at the other end by means of the inwardly extending disc 73 bolted to lugs 74 at the inner end of the runner 70 by means of bolts 75. The inner wheel 11 is similarly provided with an outwardly extending runner 80 which is provided with similar cylindrical pockets closed at one end by means of the web 82 and at the other end by means of the radially extending disc 83 which has its outer edge turned over to provide a sealing lip 84 closely fitted to the external periphery of the runner 80.

Within each of the runners 70 and 80 is provided an impeller 86 provided with outwardly open, axially extending, parti-cylindrical pockets 88 corresponding in number and size to the pockets in the runners 70 and 80, the ends of these pockets being of only slightly less diameter than the inner ends of the runner pockets so that there is only a slight clearance between the impeller and runner. At their ends, the impeller pockets 88 are closed by means of the radially extending web portions 89, 90, and the two impellers are preferably provided with integral annular lugs 92 by which they are closely fitted to the central portion of the driving sleeve 18, and are keyed thereto by means of the key 93. The impellers 86 may be duplicates of each other and are assembled with their annular rings adjacent to each other forming a spacing member for the cylindrical bearing portions 95 and 96 of the outer wheel 10 and the inner wheel 11, respectively.

Means are provided for sealing the hydraulic chambers while permitting relative rotation therebetween, and for this purpose a spacing member 98 is positioned between the adjacent radially inner edges of the plates 73 and 83, while these plates are held together and leakage is prevented by means of the annular grooved member 99, the inner ends of the discs 73 and 83 fitting into the groove. The groove member 99 is preferably formed of synthetic rubber or other durable resilient material and serves to prevent leakage of the hydraulic fluid from the hydraulic chambers.

Due to the distance to which the discs 73 and 83 extend radially inwardly, there is no hydraulic pressure exerted on the sealing member 99 while the wheels are being rotated sufficiently fast to exert any substantial centrifugal force on the liquid, and when the vehicles are at rest, there is only the slight gravitational head on the hydraulic liquid tending to cause leakage of the liquid past the rubber seal 99.

In the operation of this embodiment, the impellers 86 are rotated by the driving axle 14. The wheels 10 and 11 are mounted for independent rotation on the driving sleeve 18, and integrally connected with the inner and outer wheels 10 and 11 are the runners 70 and 80 which receive and are impelled by the hydraulic fluid moving at a relatively high velocity through the action of the impellers 86. This velocity is absorbed by the pockets of the runners 70 and 80 so that the velocity head of the liquid is transformed into torque to rotate the wheels 10 and 11, applying equal torque to both wheels and at the same time allowing the wheels to rotate independently of each other as the turning of the vehicle or other road conditions may require.

As with the first described embodiment, the relatively small amount of slip occurring in the hydraulic transmissions makes it possible to dispense with the conventional differential gearing generally provided at the center of the driving axle. Any suitable form of braking means may be provided, but as shown in Figure 3 a conventional brake drum 100 having an inwardly extending flange 101 is adapted to be secured by bolts 102 to a flange 103 formed upon the inner end of sleeve member 18, so that the braking force is applied equally to both wheels through the hydraulic transmissions.

The invention in its broader aspects is not limited to the specific mechanisms shown and described but departures may be made therefrom within the scope of the accompanying claims without departing from the principles of the invention and without sacrificing its chief advantages.

What I claim is:

1. A driven dual wheel assembly including in combination a driving sleeve, a pair of side by side, independently rotatable wheels mounted on said sleeve, a pair of runners extending towards each other from their respective wheels, sealing means between the adjacent edges of the runners, and impeller means mounted on said sleeve to be driven thereby and positioned between the wheels and within the runners.

2. A driven dual wheel assembly including in combination a driving sleeve, a pair of side by side, independently rotatable wheels mounted on said sleeve, a pair of runners extending towards each other from their respective wheels, each runner being formed as a relatively deep annular cavity, impeller means mounted on said sleeve and positioned between the wheels to extend into each annular cavity, and means for preventing leakage of fluid from the runners.

3. In a fluid drive for a dual wheel assembly, a driving sleeve, a pair of independently rotatable wheels arranged side-by-side and rotatable about the sleeve, a unitary dual impeller centrally attached to the sleeve to rotate therewith and having vaned portions arranged side-by-side and on opposite sides of its point of attachment to the sleeve, and a pair of runners, one fixed to each wheel, extending toward each other from the wheels and comprising hollow bodies having portions provided with vanes enclosed therein for cooperation with the sets of vaned portions of the impeller and portions free from vanes and telescopically receiving the vaned portions of the impeller and forming independently rotatable sections of a casing enclosing the impeller.

4. In a dual wheel assembly, a driving member, a pair of spaced independently rotatable wheels arranged side-by-side in close proximity to each other, and fluid drive means inter-connecting the driving member and wheels for driving the wheels from the driving member, said fluid drive means comprising an impeller driven by the driving member and having vaned portions, and runners formed of hollow bodies arranged side-by-side and connected to the hubs of the wheels and sealed at their adjacent ends against the escape of fluid and including compartments having vanes enclosed therein for cooperation with the vanes of the impeller and compartments free from vanes and telescopically receiving and enclosing the vaned portions of the impeller, said impeller and runners being disposed laterally at one side of and out of alinement with the space between the wheels.

5. A driven dual wheel assembly comprising a pair of independently rotatable outer and inner wheels arranged side-by-side in close proximity to each other, a driving member, and a fluid driving means interconnecting the driving member and wheels for driving the wheels from the driving member, said fluid drive means comprising an impeller fixed to the driving member within the plane of the outer wheel and having vaned portions, and runners formed of hollow bodies arranged side-by-side and connected to the hubs of the wheels, said runners being arranged substantially within the plane of the outer wheel and being sealed at their adjacent ends against the escape of fluid and including compartments at their relatively outer ends having vanes enclosed therein for cooperation with the vanes of the impeller and compartments at their relatively inner ends free from vanes and telescopically receiving and enclosing the vaned portions of the impeller.

6. In a fluid drive for a dual wheel assembly, a driving sleeve, a pair of wheels arranged side-by-side in close proximity to each other, said wheels having hub portions extending toward each other and mounting the wheels for independent rotation on the sleeve, an impeller fixed centrally to the sleeve between said hub portions and having impeller portions extending in opposite directions over the hub portions toward the wheels, said impeller portions being provided with sets of vanes, a pair of runners carried by and extending outward radially and inwardly toward each other from the hub portions and comprising with said hub portions hollow bodies having portions provided with vanes enclosed therein for cooperation with the sets of vanes of the impeller and portions free from vanes and telescopically fitting about the impeller portions of the impeller and conjointly forming a casing containing the working fluid and enclosing the impeller, and sealing means for fluid tightly closing the casing against the escape of the working fluid.

7. In a dual wheel assembly, a driving member, a pair of spaced independently rotatable wheels arranged side-by-side in close proximity to each other, and fluid drive means inter-connecting the driving member and wheels for driving the wheels from the driving member, said fluid drive means comprising an impeller connected to the driving member and having vaned portions, and runners formed of hollow bodies arranged side-by-side and connected to the hubs of the wheels and sealed at their adjacent ends against the escape of fluid and including compartments having vanes enclosed therein for co-operation with the vanes of the impeller and compartments free from vanes and telescopically receiving and enclosing the vaned portions of the impeller, the said impeller and runners being so relatively arranged and connected respectively to the driving member and to the wheels as to be disposed at one side of and out of alinement with the space between the wheels.

8. A driven duel wheel assembly comprising a pair of independently rotatable outer and inner wheels arranged side-by-side in close proximity to each other, a driving member, and a fluid driving means interconnecting the driving member and wheels for driving the wheels from the driving member, said fluid drive means comprising an impeller having vaned portions and fixed to the driving member so as to lie within the plane of the outer wheel, and runners formed of hollow bodies disposed side-by-side and connected to the hubs of the wheels, said runners being sealed at their adjacent ends against the escape of fluid and connected to the wheels so as to lie within the plane of the outer wheel and including compartments at their relatively outer ends having vanes enclosed therein for cooperation with the vanes of the impeller and compartments at their relatively inner ends free from vanes and telescopically receiving and enclosing the vaned portions of the impeller.

CHARLES S. ASH.